(12) United States Patent
Shikari et al.

(10) Patent No.: US 9,268,870 B2
(45) Date of Patent: Feb. 23, 2016

(54) PORTAL MODULARIZATION TOOL

(75) Inventors: Faiyaz Shikari, Cumming, GA (US); Dhiraj Sharma, Roswell, GA (US)

(73) Assignee: Xerox Business Services, LLC, Dallas, TX (US)

(*) Notice: Subject to any disclaimer, the term of this patent is extended or adjusted under 35 U.S.C. 154(b) by 890 days.

(21) Appl. No.: 13/550,998

(22) Filed: Jul. 17, 2012

(65) Prior Publication Data
US 2014/0026026 A1    Jan. 23, 2014

(51) Int. Cl.
*G06F 17/00* (2006.01)
*G06F 17/30* (2006.01)
*G06F 9/44* (2006.01)
*G06F 17/21* (2006.01)
*G06F 17/24* (2006.01)
*G06F 9/445* (2006.01)

(52) U.S. Cl.
CPC ........... *G06F 17/3089* (2013.01); *G06F 8/36* (2013.01); *G06F 8/60* (2013.01); *G06F 17/211* (2013.01); *G06F 17/24* (2013.01)

(58) Field of Classification Search
CPC .... G06F 17/211; G06F 17/24; G06F 17/3089
See application file for complete search history.

(56) References Cited

U.S. PATENT DOCUMENTS

| | | | | |
|---|---|---|---|---|
| 5,772,585 A * | 6/1998 | Lavin | .................... | G06F 19/322 128/920 |
| 6,684,369 B1 * | 1/2004 | Bernardo | .............. | G06F 17/211 707/E17.116 |
| 7,475,089 B1 * | 1/2009 | Geddes | ................ | G06F 17/3089 |
| 7,716,665 B2 * | 5/2010 | Buehler | ............... | G06F 17/3089 709/250 |
| 8,086,953 B1 * | 12/2011 | Gabber | ............. | G06F 17/30899 707/709 |
| 8,181,112 B2 * | 5/2012 | Jolley | ................ | G06F 17/30873 715/739 |
| 8,255,786 B1 * | 8/2012 | Gattani | ............. | G06F 17/30014 715/205 |
| 8,527,869 B2 * | 9/2013 | Hosea | ............... | G06F 17/30905 707/732 |
| 2004/0070605 A1 * | 4/2004 | Huang | .............. | G06F 17/30873 715/744 |
| 2004/0183831 A1 * | 9/2004 | Ritchy | ................ | G06F 17/3089 715/762 |
| 2005/0235256 A1 * | 10/2005 | Freydl | ....................... | G06F 8/34 717/107 |
| 2006/0004923 A1 * | 1/2006 | Cohen | ............... | G06F 17/30902 709/228 |
| 2006/0036993 A1 * | 2/2006 | Buehler | .............. | G06F 17/3089 717/104 |

(Continued)

FOREIGN PATENT DOCUMENTS

WO    WO 2008042956 A2 *    4/2008    ............. G06Q 10/06

OTHER PUBLICATIONS

IBM, "WebSphere Portal 7.0", IBM Corporation, copyrighted 2010, 3594 pages.*

(Continued)

*Primary Examiner* — Cesar Paula
*Assistant Examiner* — David Faber
(74) *Attorney, Agent, or Firm* — Conley Rose, P.C.; Grant Rodolph; Nicholas K. Beaulieu

(57) ABSTRACT

An apparatus for developing web portals includes a portal decomposer configured to generate a plurality of modules from a web portal, a portal composer configured to generate a plurality of portal versions using a plurality of selections of the modules, wherein the selections of modules include a local module deployed on a host of the web portal and a remote module deployed on a second host coupled to the host of the web portal. An application for decomposing and composing web portals includes plurality of instructions that cause a processor to decompose a first web portal into a plurality of portal modules; and compose a second web portal that is a version of the first portal from a set of selected modules from the portal modules.

24 Claims, 8 Drawing Sheets

(56) References Cited

U.S. PATENT DOCUMENTS

| | | | | |
|---|---|---|---|---|
| 2006/0041890 A1* | 2/2006 | Pik | G06F 9/5055 | 719/315 |
| 2007/0061707 A1* | 3/2007 | Sally | G06F 17/30905 | 715/210 |
| 2008/0033988 A1* | 2/2008 | Narayan et al. | | 707/103 R |
| 2008/0126537 A1* | 5/2008 | Engehausen | G06F 17/3089 | 709/224 |
| 2008/0183720 A1* | 7/2008 | Brown et al. | | 707/10 |
| 2008/0281898 A1* | 11/2008 | Pesce | G06F 17/30873 | 709/201 |
| 2008/0295003 A1* | 11/2008 | Behl | G06F 17/30873 | 715/760 |
| 2009/0158166 A1* | 6/2009 | Dewar | G06Q 30/02 | 715/745 |
| 2009/0171692 A1* | 7/2009 | Zilberman | G06F 19/322 | 705/2 |
| 2010/0064207 A1* | 3/2010 | Huang | G06F 17/30 | 715/206 |
| 2010/0070847 A1* | 3/2010 | Hampton | G06F 17/3089 | 715/234 |
| 2010/0211886 A1* | 8/2010 | Forstall | G06F 3/0486 | 715/745 |
| 2010/0275116 A1* | 10/2010 | Sun | G06F 17/30873 | 715/234 |
| 2011/0047611 A1* | 2/2011 | Hayler | G06F 12/1466 | 726/12 |
| 2011/0066977 A1* | 3/2011 | DeLuca | G06F 17/30867 | 715/811 |
| 2011/0145364 A1* | 6/2011 | Joyce | G06F 9/54 | 709/219 |
| 2012/0079568 A1* | 3/2012 | Whitmyer, Jr. | G06F 17/3089 | 726/4 |
| 2012/0216109 A1* | 8/2012 | DeLuca | G06F 17/30867 | 715/234 |
| 2013/0167072 A1* | 6/2013 | Ari | G06F 3/0481 | 715/790 |

OTHER PUBLICATIONS

Khurana, Arun, "What is XML Access", Mar. 2011, 1 pg http://www.webportalclub.com/2011/03/what-is-xml-access.html.*

IBM Rational® Software Architect, "Defining local servers for testing portals", IBM Corporation, copyrighted 2011, 3 pages. http://pic.dhe.ibm.com/infocenter/rsahelp/v8/index.jsp?topic=%2Fcom.ibm.portal.doc%2Ftopics%2Ftportalserverlocal.html; http://pic.dhe.ibm.com/infocenter/rsahelp/v8/index.jsp.*

* cited by examiner

PORTAL MODULARIZATION TOOL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A web portal, also referred to as a portal, is a website comprising one or more web pages that bring together information from one or more sources in a unified way. Typically, each information source is dedicated an area, also referred to as a portlet, on a web page for displaying information, e.g., a window on the web page. The portlet may be one of the modules that constitute the portal. Web portals are used for different web features and services, such as search engines, email services, news, stock prices, information, databases, entertainment, other applications, or combinations thereof. The portals allow enterprises (e.g., Internet and online businesses) to provide a consistent or familiar look and feel with access control and procedures for different applications and databases.

Portals may be public web portals for general public use and access. Examples of public web portals include Microsoft Network (MSN)™, iGoogle™, Yahoo™, and America Online (AOL)™. Other portals may be designed for specified use and access, such as portals for ecommerce, healthcare benefits information, cloud storage, etc. Web developers may design, package, and customize portals and portlets for customers, such as Internet based businesses and other industries that use web based applications for providing services. For example, a healthcare payer (e.g., a healthcare insurance company) may use a healthcare befits information portal to allow healthcare insurance plan members and/or healthcare service providers to access healthcare benefits eligibility information online.

SUMMARY

In an embodiment, the disclosure includes an apparatus for developing web portals comprising a portal decomposer configured to generate a plurality of modules from a web portal, a portal composer configured to generate a plurality of portal versions using a plurality of selections of the modules, wherein the selections of modules comprise a local module deployed on a host of the web portal and a remote module deployed on a second host coupled to the host of the web portal.

In another embodiment, the disclosure includes an application for decomposing and composing web portals, comprising a plurality of instructions that cause a processor to decompose a first web portal into a plurality of portal modules, and compose a second web portal that is a version of the first portal from a set of selected modules from the portal modules.

In another embodiment, the disclosure includes a method for decomposing a web portal, comprising decomposing a web portal that comprises a plurality of portal pages including a plurality of portlets and other software components into a plurality of modules, and maintaining the modules in a plurality of corresponding module files to generate subsequently a plurality of web portal packages that comprise at least some of the portlets and other software components of the web portal.

In yet another embodiment, the disclosure includes a method for composing a web portal, comprising composing a web portal from a subset of modules selected from a plurality of available modules that comprise a plurality of portal pages including a plurality of portlets and other software components, and filling any gaps in the web portal that occur due to excluding in the selected subset of modules one or more of the available modules.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
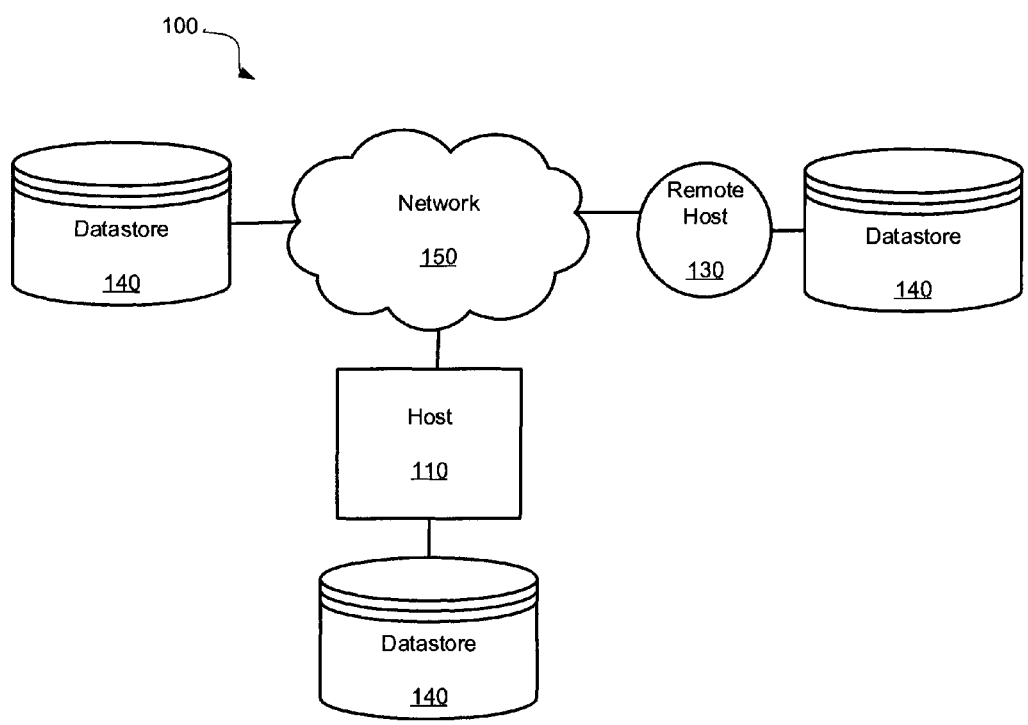
FIG. 1 is a schematic diagram of an embodiment of portal development and deployment system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Web portals may represent an aggregation of various functionalities, which may be enabled or displayed in portlets that form the web portals. In some cases, parts of the portals may be packaged or sold, where only a subset of all available functionalities and portlets may be included. Different subsets of the functionalities and portlets may be included to provide different portal packages for marketing driven considerations, e.g., to offer portal packages to Internet and online businesses with limited functionalities at reduced prices. In some cases, a subset of portlets may be packaged for software development considerations, e.g., to focus software development to a reduced set of functionalities. Subsets of portlets may also be packaged for software deployment considerations, e.g., based on locally and/or remotely deploy portlets and software components. Typically, a plurality of portal packages or versions may be needed, e.g., one for each combination of functionalities or portlets selected, for each permutation of local/remote deployments, or combinations thereof. This may make the process of packaging of different functionalities and portlets to provide different portal versions more cumbersome, costly, and time consuming.

Disclosed herein is a system and method for simplifying the packaging of portals into different portal versions and improving portal deployment. The system may comprise a composition/decomposition tool, referred to herein as an intelligent composer/decomposer (iCODE) tool that is configured to decompose a portal into a plurality of individual modules that provide different functionalities and compose different portal versions using the modules. The composed portal packages may comprise different groupings of portal software components, also referred to herein as modules, and may promote adding any missing modules to the packages. The missing modules may be part of the available modules obtained after decomposing a source portal, e.g., a complete portal that includes all available modules.

The method may comprise breaking up or decomposing the source or complete portal into a plurality of modules and subsequently reconstituting or composing one or more functioning portal applications based on selected modules from the set of available modules and the deployment location(s) of the modules. The selected modules may be local modules, remote modules, or combinations of both and may be displayed via portlets that form web portal applications. The iCODE tool and method may substantially reduce the effort needed to create, manage, and keep synchronized and separate versions of the portal application and simplify deployment of portals and modules. The iCODE tool may enable the packaging of web portals with the modules of interest to customers (e.g., Internet businesses and businesses with online services) and further serve as a marketing tool to promote the sale of additional missing modules in the portal packages sold to customers, as described below.

FIG. 1 illustrates an embodiment of a portal development and deployment system 100, which may be used to build a plurality of portals, e.g., portal packages, applications, or versions. The portals may be built using a plurality of modules that may be deployed in local and/or remote locations to the hosts (e.g., servers) of the portals. The different portal packages, applications, or versions may be built using a shared set of available modules for a source portal. The source portal may comprise all the available modules that offer a more complete set of functionalities than at least some of the built portals. The built portals may comprise different groupings of the available modules that provide different levels and/or number of functionalities and may be sold (or offered) at different prices to customers, e.g., based on the number or level of corresponding modules or functionalities. The different portals may comprise different groupings of portlets based on the included modules and functionalities in the portals.

The portal development and deployment system 100 may comprise a host 110, one or more remote hosts 130, one or more data stores 140, and one or more networks 150, which may be arranged as shown in FIG. 1. The host 110 may be any component, device, or apparatus configured to host and run one or more web portal applications, also referred to herein as portals or web portals, including at least some of the portals' modules (local modules). For instance, the host 110 may be a physical sever or a general-purpose computer, e.g., at a data center or a network. The remote host(s) 130 may be any components, devices, or apparatuses configured to host and run one or more remote modules for the portal applications.

The data stores 140 may be any devices or components configured to store data for the portal development and deployment system 100. The stored data may include software or computer program code for the portal and module definitions and any other data related to implementing and running the portals and the portals' functionalities. The data stores 140 may comprise one or more local data stores coupled to the host 110 at the same location, e.g., the same data center or network, one or more remote data stores coupled to the remote hosts 130 or distributed in the networks(s) 150, or combinations thereof. The network(s) 150 may be any network(s) that communicate(s) with and allow(s) communications between the host 110, the remote hosts 130, the data stores 140, including local and/or remote data stores. The network(s) 150 may comprise one or a plurality of access/transport networks that may be based on one or more network transport technologies and protocols. Examples of the networks 150 may include the Internet, Ethernet networks, optical backbone networks, digital subscriber line (DSL) networks, local area networks (LANs), wireless area networks (WANs), other types of telecommunication networks, or combinations thereof.

Additionally, the host 110 may be configured to run and implement an iCODE tool (e.g., a software or a program) for generating the portals' modules and different portal packages, applications, or versions using the modules. The iCODE tool may comprise a decomposer tool (e.g., a software or program) configured to decompose a portal (e.g., a source portal) into a plurality of modules, a composer configured to compose one or more portals (e.g., different portal packages, applications, or versions) using grouping of the modules, or both. Additionally or alternatively, the iCODE tool, the decomposer tool, and/or the composer tool may be implemented using firmware or hardware (e.g., at the host 110). The modules may be defined or determined functional parts of the portal websites. The software components needed to provide a functionality represented by a module of a portal may depend on the portal's server (e.g., virtual server) implementation. For instance, a module for an International Business Machine (IBM) Websphere portal server version 7 implementation may comprise the following software components: themes, skins, pages, portlets, wires, and Uniform Resource Locator (URL) mappings.

Figure 2:
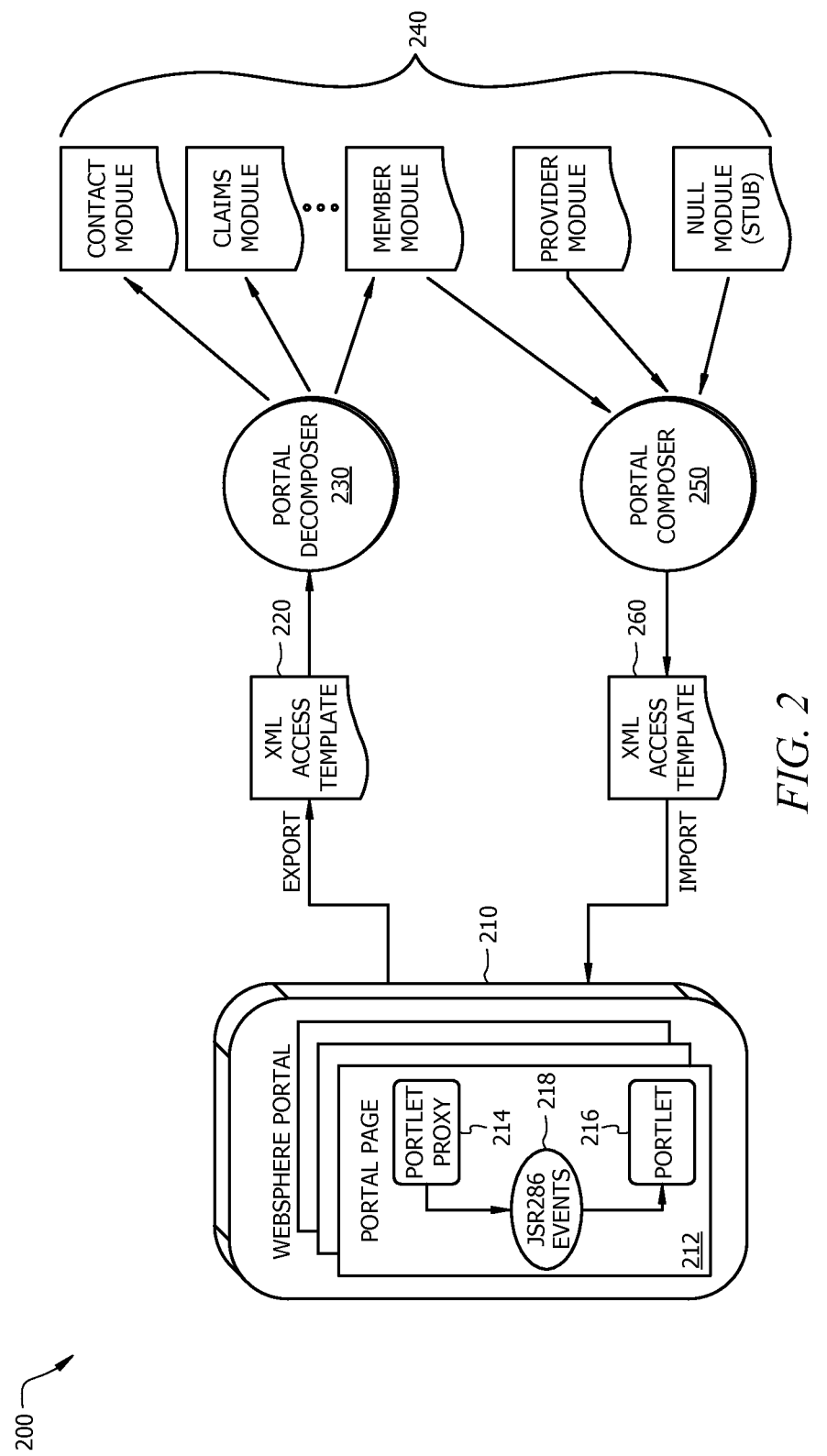
FIG. 2 is a schematic diagram of an embodiment of an intelligent composition decomposition (iCODE) scheme.

FIG. 2 illustrates an embodiment of an iCODE scheme 200 that may be used by the iCODE tool, e.g., in the portal development and deployment system 100, to generate a plurality of modules and a plurality of portals that use the modules. A portal or a portal definition 210, which may comprise one or more portal pages 212 may be decomposed using a portal decomposer 230 (of the iCODE tool) into a plurality of modules 240. A least some of the modules 240 may also be composed using a portal composer 250 (of the iCODE tool) into the portal definition 210 or a variation of the portal definition 210. In a scenario of the IBM Websphere portal server implementation, the portal definition 210 may be exported to an Extensible Markup Language (XML) access template (XAT) 220, which may be forwarded to the portal decomposer 230. For instance, the XAT 220 may be an XML file generated by an IBM Websphere portal server to export the portal definition 210 (e.g., an IBM websphere portal definition). A second XAT 260 may also be imported from the portal composer 250 into the portal definition 210 or a variation of the portal definition 210. The XAT 220 and the second XAT 260 may each comprise data from a plurality of XML files that include the software components of the portal definition 210, e.g., components of the portal pages 212. The XAT 220 and the second XAT 260 may be files that combine the data of the portal definition 210 in a file format that is suitable for processing by a template engine, such as the portal decomposer 230 and the portal composer 250.

The portal definition 210 may be an IBM Websphere defined portal, where the portal pages 212 may comprise a plurality of components, including a portlet proxy 214, a portlet 216, and one or more Java Specification Request (JSR) events 218, e.g., JSR286 events, that enable communications between the portlet proxy 214 and the portlet 216. The portal pages 212 may also comprise one or more Web Service Remote Portlets (WSRPs) (not shown) that enable communications between a remotely deployed (not shown) and the portlet 216. The portlet 216 may be a pluggable user interface software component that is managed and displayed in a web portal. The portlet 216 may produce fragments of markup code that are aggregated into a portal. A portal page 212 may be displayed as a collection of non-overlapping portlet windows, where each portlet window displays a portlet 216. One or more portlets 216 may provide a web-based application that is hosted in a portal. Some examples of portlet applications are email, weather reports, discussion forums, and news. The portlet proxy 214 may be a software component configured to allow showing a website (or any content accessible using Hypertext Transfer Protocol (HTTP)) as if it was a portlet. The portlet proxy 214 may be used to incorporate arbitrary web content as a portlet and provide a mechanism for connecting to and rendering HyperText Markup Language (HTML) with options for clipping, maintaining session information, handling cookies. Proxied content may be rendered within the portlet window. The portlet proxy 214 may be used to incorporate web content or applications that are built and run in non-Java environments allowing a website the flexibility for integrating with different technologies. The JSR286 is a Java Portlet specification version 2.0 developed under the Java Community Process (JCP). The features of the JSR286 may comprise inter-portlet communication (e.g., between the portlet proxy 212 and the portlet 214) through events and public render parameters, serving dynamically generated resources directly through portlets, serving Asynchronous JavaScript and XML (AJAX) or JavaScript Object Notation (JSON) data directly through portlets, introduction of portlet filters and listeners, or combinations thereof.

The modules 240 comprise different functionalities associated with the portal definition 210. For instance, in the case of a portal application for processing healthcare benefits claims, the modules may comprise a contact module, claims module, a member module, a provider module, a null module, other modules, or combinations thereof. Such modules 240 may be part of the portal definition 210 (a web portal) that may be sold to healthcare enterprises that offer online services, such as to healthcare payers or insurance companies that offer plan members/healthcare providers online or electronic benefits eligibility verification services.

The portal decomposer 230 may decompose the portal or portal definition 210 into a plurality of modules 240 based on different schemes. In one scheme, a plurality of page hierarchy based modules may be generated, where the portal definition 210 may be structured into a content tree (of software components) comprising a root content node and a plurality of content leaf nodes (or leafs) that include portlets, themes, skins, wires, and/or other components. The wires may be software components configured to allow portlets to interact with each other. For example, portlets may exchange information or an action in one portlet may update another portlet using a wire. For instance, a wire may allow two or more portlets to transfer information so that an action, publishing event, or click in a source portlet automatically triggers an action or event and updates the display in the target portlet. Thus, multiple portlets may be updated simultaneously when information is changed. The theme may be a software component that determines a package for graphical appearance details for a web portal. The theme may be used to customize the look and feel of the web portal or the portal pages of the web portal. Sometimes, graphics themes for web portals are referred to as skins, and the two terms may be used interchangeably. However, the difference between themes and skins may be in scope. The skin may be a software component configured to define the border rendering around components of web portal, such as row containers, column containers, or portlets in a web portal or a portal page. Skins may be installed independently from themes. However, a skin may be associated with a theme.

Each module 240 may be associated with one or more portal pages 212 and may correspond to one of the immediate children (first leafs) of the root content node. In another scheme, a plurality of web archive based modules may be generated, where each module 240 may include all the content nodes (in the content tree of a portal page 212) that use one or more portlets 216 that may be defined in a corresponding Web Archive (WAR) file. In yet another scheme, the modules 240 may be generated based on a pre-determined module definition (e.g., by a developer), also referred to herein as a manual module definition. For instance, a subject matter expert (e.g., a developer of the web portal) may examine the portal website and then select the parts of the portal application (e.g., the web pages, portlets, wires, URL mappings, etc.), which may be considered a functional unit, to manually define one or more modules. The portal decomposer 230 may receive as input the XAT 220 and decompose the XAT 220 into a set of modules 240 based on the manual module definition. The resulting module definitions may be stored into one or more XML text files.

The portal composer 250 may compose the portal definition 210 or a variation of the portal 210 using selected modules from the available modules 240, which may be previously generated by the portal decomposer 230, as described above. For instance, a subset of the modules 240 may be selected by a user to compose a portal, e.g., a version of the portal definition 210 that have fewer functionalities. The user may be a developer or any user that has authorization to compose a portal from the available modules 240. For example the user may be or belong to the customer (e.g., an enterprise) that has purchased the portal definition 210 and the iCODE tool. If only a subset of the modules 240 (and not all the generated modules 240) is selected, then there may be gaps (or missing functions) in the composed portal website or definition resulting from the omitted modules 240. In this case, the portal composer 250 may fill or plug the gaps due to the missing modules 240 using one of various schemes.

In one scheme, the portal composer 250 may use a null module stub approach to fill the gaps due to missing modules. A generic or null module is a module that provides a generic or null implementation for a null portlet and/or a null portal page including a null wire portlet. The null portlet may display details of the portlet and module that are replaced. In some embodiments, the null portlet may present details for upselling the missing module, such as a message to the customer (e.g., a buyer of the portal website) to order the missing portlet and module for a price. Thus, the iCODE tool or the portal composer 250 may enable the marketing and selling of the different modules 240 in pre-determined packages, e.g., "a la carte". The null wire portlet may display details of the module that was excluded from the selected modules 240. Other null wire portlet implementations may also be used.

After the portal composer 250 collects or assembles the selected modules 240, the portal composer 250 may implement a portal definition verification pass or process to identify which portlets and wires are missing from the portal definition to be generated, e.g., in comparison to the source portal definition 210 that was decomposed by the portal decomposer 230 to obtain the modules 240. According to the null module stub approach, for missing portlets associated with the missing modules 240, the portal composer 250 may add a null portlet in the generated portal definition 210. For missing pages and portlet side of wires associated with the missing modules 240, the portal composer 250 may also add a null portlet page comprising a null wire portlet to the portal definition 210.

In another scheme, the portal composer 250 may use a silent stub approach to fill the gaps in the composed portal definition 210. Accordingly, the portal composer 250 may stub out the functionality gaps in the portal definition 210 to guarantee that there is no feedback to indicate missing information to the customer or the user of the resulting portal website. For instance, during the portal definition verification pass, the portal composer 250 may remove the portlets and wires comprising targets that are part of the missing modules 240.

Additionally, the portal decomposer 230 and/or the portal composer 250 may allow a user (e.g., a developer or any authorized user) to specify one or more local and/or remote deployment location(s) of web archive(s) for the portal definition 210, which may store and maintain the different modules 240 of the portal definition 210. For example, the local/remote locations may correspond to local/remote servers, networks, data centers, network nodes, or combinations thereof. The remote deployments of the modules 240 may be achieved by remotely deploying the corresponding portlets using Web Service Remote Portlet (WSRP) specifications. The portal composer 250 may generate the portal definition 210 in accordance with the local/remote deployment locations for the web archives selected by the user. Using WSRP specifications may simplify the deployment and deployment architecture of portals and improve the deployment uptime, e.g., to about 99.5 percent or more. The local/remote deployment architecture of the iCODE tool may also eliminate a syndrome referred to sometimes as a "Bad Neighbor Syndrome", where only the users of a deployed module that consumes excessive resources or goes down (e.g., due to a hardware or software fault of the deployed location) may be affected by the performance degradation or failure and not other users of other modules deployed at other locations that remain intact.

Figure 3:
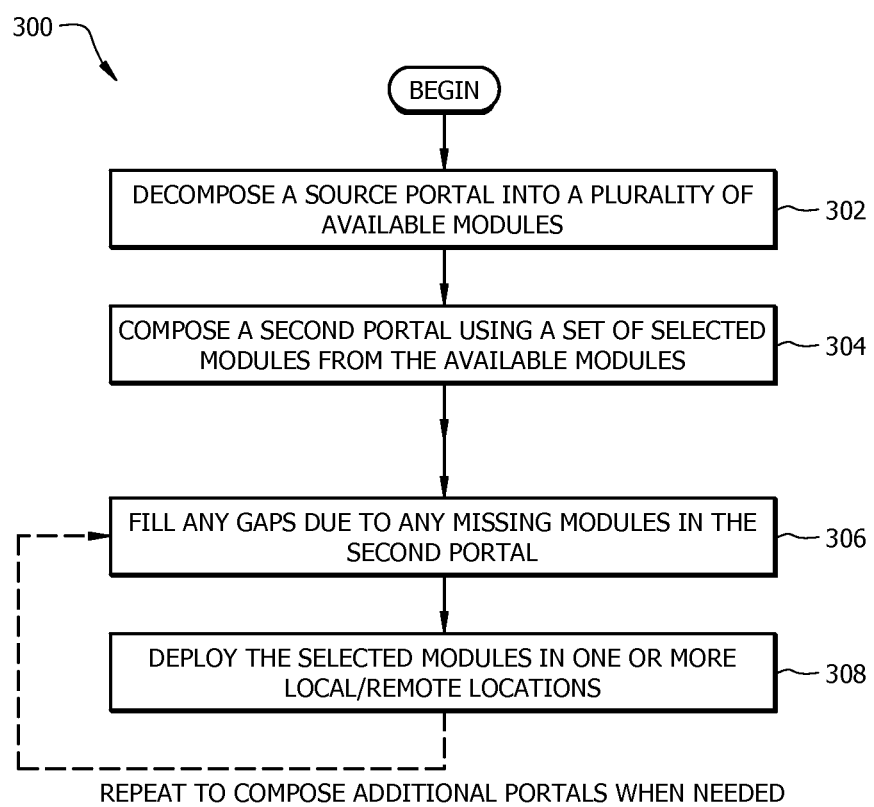
FIG. 3 is a flowchart of an embodiment of an iCODE method.

FIG. 3 illustrates an embodiment of an iCODE method 300 that may be implemented using iCODE tool, e.g., as part of the iCODE scheme 200. The iCODE method 300 may be implemented using the portal decomposer 230 and subsequently the composer 250 of the iCODE tool to build a plurality of portal packages or versions using an available set of modules associated with a single portal, e.g., a source or complete portal definition, also referred to herein as a monolithic portal. The method 300 may begin at block 302, where a source portal may be decomposed into a plurality of modules. The source portal may be a monolithic portal that comprises a complete set of developed modules for a web portal, e.g., a portal website for healthcare benefits eligibility information/verification. The source portal may be developed by a developer (or a team of developers) to include all the supported functionalities and features for the portal that may be offered or sold to customers (e.g., healthcare enterprises). The source portal definition may be decomposed using a decomposer tool, which may be part of the iCODE tool.

At block 304, a second portal may be composed using a set of selected modules from the available modules. The selected modules may be a subset of all the available modules and hence the resulting second portal may have fewer functionalities than the source (monolithic) portal. Alternatively, all the available modules may be selected to compose a second module substantially similar to the source (monolithic) module. However, this second (monolithic) module may be customized for a second customer. At block 306, any gaps due to any missing modules in the second portal may be filled. The composer may implement a portal definition verification pass to identify which portlets, wires, or other components associated with a module are missing, and may fill the detected gaps using the null module stub approach or the silent stub approach, as described above. At block 308, the selected modules may be deployed in one or more local/remote locations. For example, some of the modules maybe deployed locally at the same local network or data center and the remaining modules may be deployed at one or more remote networks or locations. The steps 304 to 308 may be repeated to compose additional portals (or portal versions/packages) when needed.

Since the modules may be generated initially, e.g., only once, when the source portal is decomposed, and subsequently grouped to provide additional portal versions, the method 300 may simplify portal development and reduce development time and cost. The method 300 may also simplify adding and/or subtracting modules to different portal versions or packages that may be offered to customers. Thus, the portal definition may be changed to fit different customer needs in a relatively simple and fast manner, e.g., in comparison to developing different portal definitions and/or different sets of modules for different customers. In other embodiments of an iCODE method, a plurality of source portals (e.g., monolithic portals) may be decomposed into a plurality of modules that may be made available. A plurality of new portals may also be composed using different groupings of the available modules that may be deployed in different locations. The modules may be deployed in a plurality of locations, including the hosts (e.g., local servers) of the portals and remote hosts (e.g., remote servers) coupled to the hosts, during the source portals decomposition process or the new portals composition process.

Figure 4:
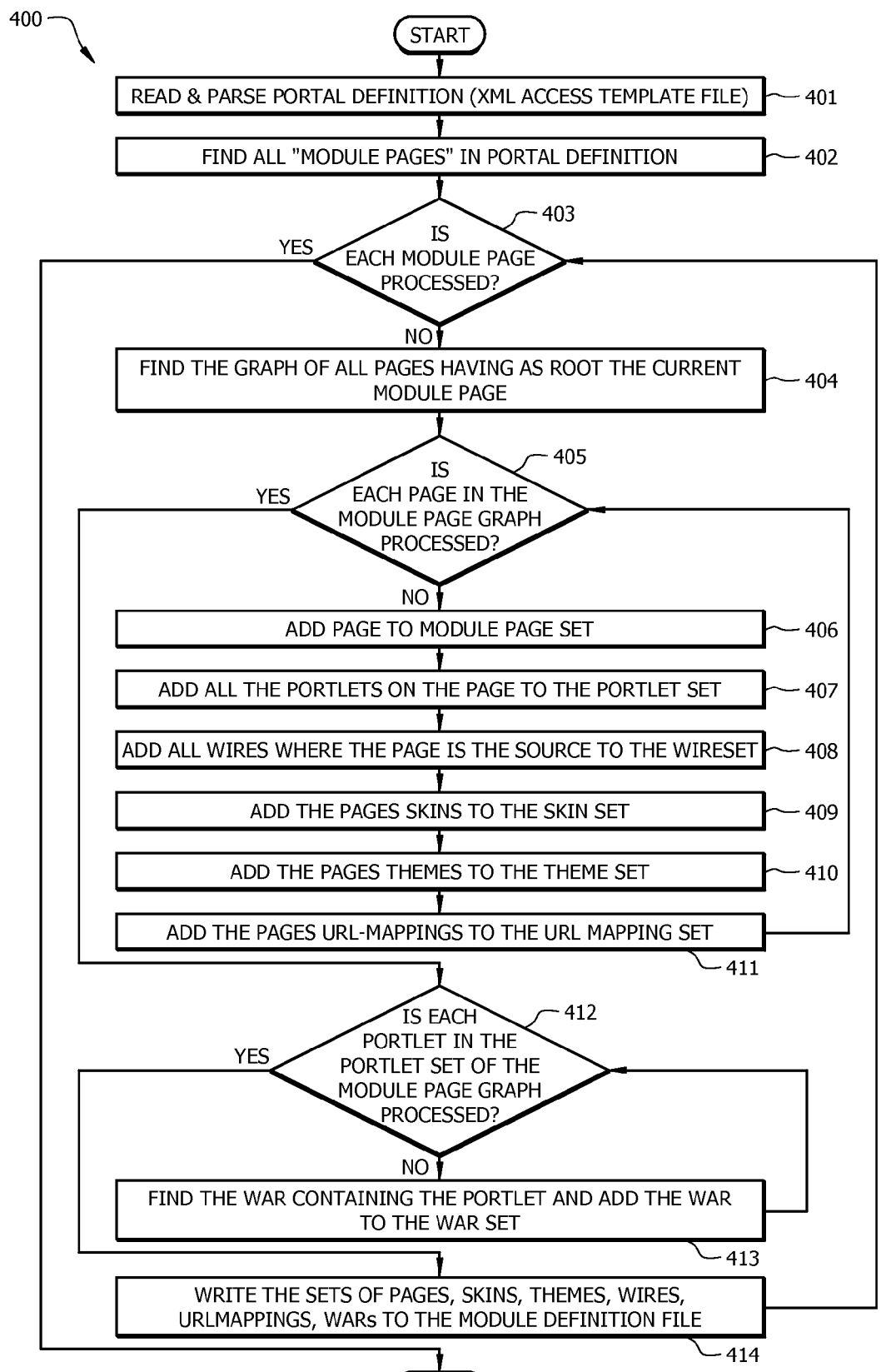
FIG. 4 is a flowchart of an embodiment of a portal decomposition method.

FIG. 4 illustrates an embodiment of a portal decomposition method 400, which may be implemented by a decomposer of the iCODE tool. Specifically, the portal decomposition method 400 may implement a page centric module decomposition algorithm, where a plurality of page hierarchy based modules may be generated. The method 400 may begin at block 401, where the decomposer may read and parse a portal definition, e.g., in the form of a XAT file. For example, the portal decomposer 230 may read and parse a portal definition 210 exported as the XAT 220. At block 402, the decomposer may find all module pages in the portal definition. A module page may be an immediate child (first leafs) of the root content node of the content tree that represents the portal definition. For example, the portal decomposer 230 may allocate all the modules 240 associated with the portal pages 212 as the immediate children of the root content node of the content tree of the portal definition 210. At block 403, the decomposer may determine whether each module page (e.g., modules 240) is processed. If any module pages are left unprocessed, then the method 400 may proceed to block 404 to process each remaining module page. Otherwise, the method 400 may end.

At block 404, the decomposer may find the graph (in the content tree) of all pages having as root a currently processed module page. The pages that have the current module page as root may correspond to the leafs under the current module page node. The leafs may correspond to software components, such as themes, skins, pages, portlets/web pages, wires, and/or URL mappings. At block 405, the decomposer may determine whether each page in the module page graph is processed. If any pages are left unprocessed, then the method 400 may proceed to block 406 to process each remaining page in the current module page. Otherwise, the method 400 may proceed to block 412. At block 406, the decomposer may add a currently processed page to a module page set. At block 407, the decomposer may add all portlets on the current page to a portlet set. The portlets may be added to the portlet set. When the portlet set is built using all the modules, the portlet set may comprise the WAR files for the portlets. At block 408, the decomposer may add all wires where the current page is the source to a wire set. At block 409, the decomposer may add the current page's skins to a skin set. At block 410, the decomposer may add the current page's themes to a theme set. At block 411, the decomposer may add the current page's URL mappings to a URL mapping set. The method 400 may then return to block 405.

At block 412, the decomposer may determine whether each portlet in the portlet set of the module page graph is processed. If any portlets are left unprocessed, then the method 400 may proceed to block 413 to process each remaining portlet in the current module page. Otherwise, the method 400 may proceed to block 414. At block 413, the decomposer may find the WAR file comprising a currently processed portlet and add the WAR file to a WAR set. At block 414, the decomposer may write the resulting sets of pages, skins, themes, wires, URL mappings, and WAR files to a module definition file (for the current module page). The method 400 may then return to block 403.

Figure 5:
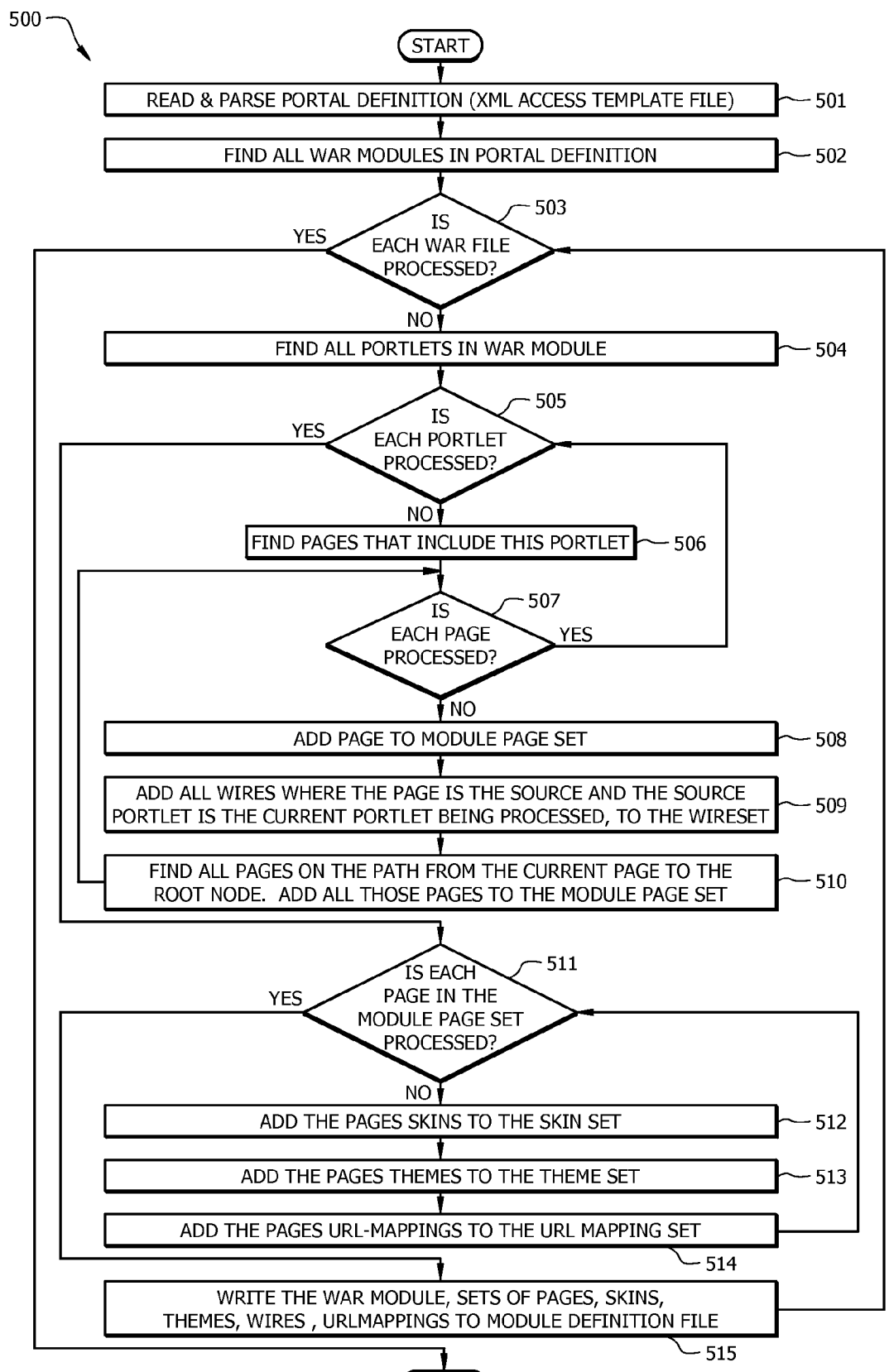
FIG. 5 is a flowchart of another embodiment of a portal decomposition method.

FIG. 5 illustrates an embodiment of another portal decomposition method 500, which may be implemented by a decomposer of the iCODE tool. Specifically, the portal decomposition method 500 may implement a WAR centric module decomposition algorithm, where a plurality of web archive based modules may be generated. The method 500 may begin at block 501, where the decomposer may read and parse a portal definition, e.g., in the form of a XAT file. For example, the portal decomposer 230 may read and parse a portal definition 210 exported as the XAT 220. At block 502, the decomposer may find all WAR modules in the portal definition. For example, the portal decomposer 230 may allocate all the WAR files that correspond to the modules 240 of the portal definition 210. At block 503, the decomposer may determine whether each WAR file is processed. If any WAR files are left unprocessed, then the method 500 may proceed to block 504 to process each remaining WAR module. Otherwise, the method 500 may end.

At block 504, the decomposer may find all portlets in a currently processed WAR module (WAR file). At block 505, the decomposer may determine whether each portlet is processed. If any portlets are left unprocessed, then the method 500 may proceed to block 506 to process each remaining portlet in the current WAR module. Otherwise, the method 500 may proceed to block 511. At block 506, the decomposer may find the pages that included a currently processed portlet. At block 507, the decomposer may determine whether each page is processed. If any pages are left unprocessed, then the method 500 may proceed to block 508 to process each remaining page associated with the current portlet. Otherwise, the method 500 may return to block 505. At block 508, the decomposer may add a currently processed page to a module page set. At block 509, the decomposer may add all wires where the current page is the source and the source portlet is the current portlet being processed to a wire set. At block 510, the decomposer may find all pages on the path from the current page to the root content node (of the portal definition), and add all these pages to the module page set. The method may then return to block 507.

At block 511, the decomposer may determine whether each page in the module page set is processed. If any pages are left unprocessed, then the method 500 may proceed to block 512 to process each remaining page in the module page set. Otherwise, the method 500 may proceed to block 515. At block 512, the decomposer may add the current page's skins to a skin set. At block 513, the decomposer may add the current page's themes to a theme set. At block 514, the decomposer may add the current page's URL mappings to a URL mapping set. The method 500 may then return to block 511. At block 515, the decomposer may write the resulting WAR module (WAR file), sets of pages, skins, themes, wires, and URL mappings to a module definition file (for the current WAR module). The method 500 may then return to block 503.

Figure 6:
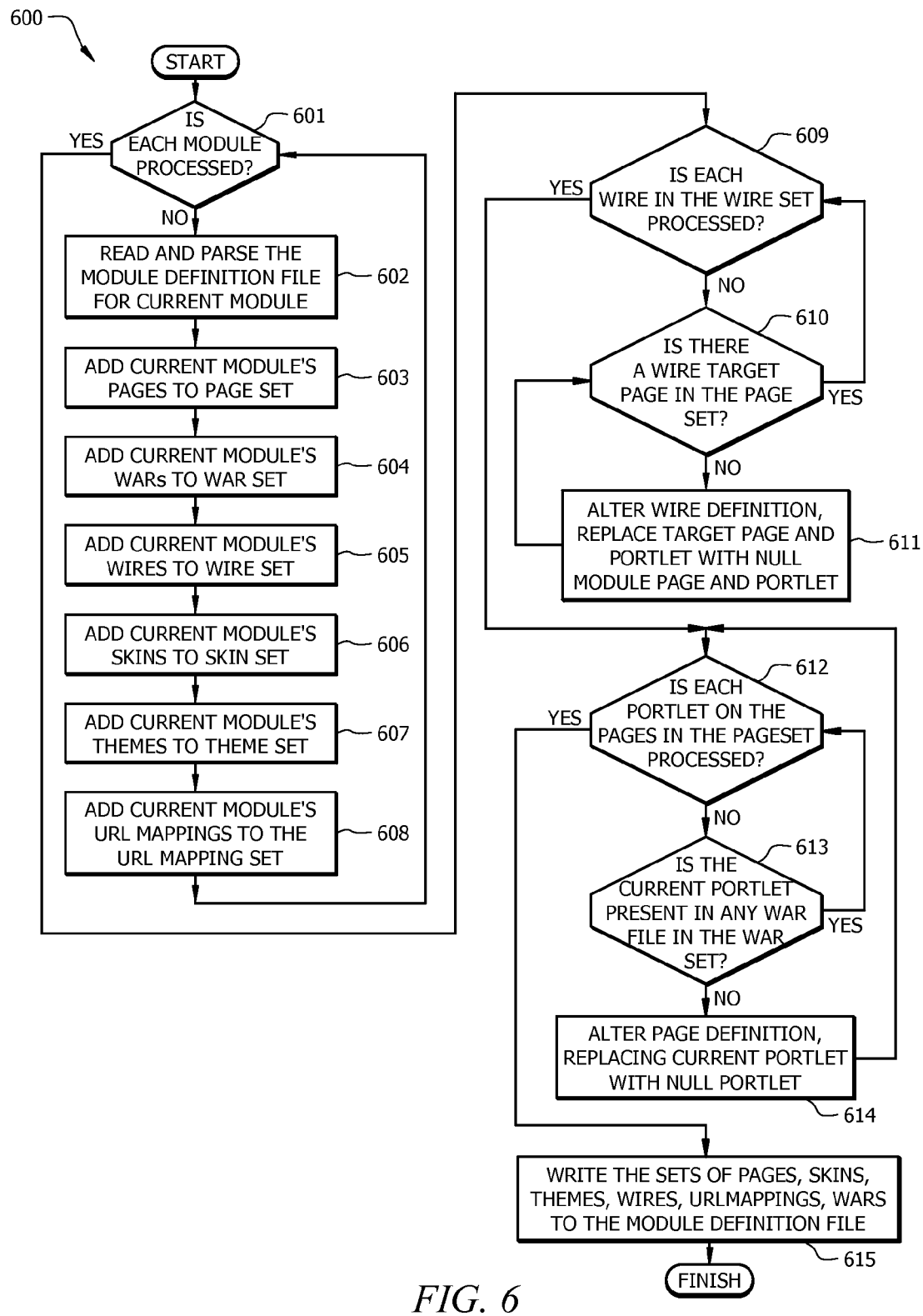
FIG. 6 is a flowchart of an embodiment of a portal composition method.

FIG. 6 illustrates an embodiment of a portal composition method 600, which may be implemented by a composer of the iCODE tool. Specifically, the portal composition method 600 may implement a null-module stub module composition algorithm to fill gaps in a composed portal website or definition, which may result from missing modules. The method 600 may begin at block 601, where the composer may determine whether each module (from a set of available modules) is processed (to guarantee that each module is processed). For instance, the portal composer 250 may verify if all the available modules 240 that were obtained by decomposing the portal definition 210 (by the portal decomposer 250) are selected or included to compose another portal 210 or a variation of the portal 210. If any module is left unprocessed, then the method 600 may proceed to block 602 to process each remaining module. Otherwise, the method 600 may proceed to block 609. At block 602, the composer may read and parse a currently processed module definition file for a current module. At block 603, the composer may add the current module's pages to a page set. At block 604, the composer may add the current module's WAR files to a WAR set. At block 605, the composer may add the current module's wires to a wire set. At block 606, the composer may add the current module's skins to a skin set. At block 607, the composer may add the current module's themes to a theme set. At block 608, the composer may add the current module's URL mappings to a URL mapping set. The method 600 may then return to block 601.

At block 609, the composer may determine whether each wire in the wire set is processed. If any wire is left unprocessed, then the method 600 may proceed to block 610 to process each remaining wire. Otherwise, the method 600 may proceed to block 612. At block 610, the composer may determine whether there is a wire target page (for a currently processed wire) in the page set. If a wire target page is found in the page set, then the method 600 may return to block 609. Otherwise, the method 600 may proceed to block 611. At block 611, the composer may alter the wire definition by replacing the wire target page and portlet with a null module page and portlet. The method 600 may then return to block 610.

At block 612, the composer may determine whether each portlet on the pages in the page set is processed (to guarantee that each portlet is processed). If any portlet is left unprocessed, then the method 600 may proceed to block 613 to process each remaining portlet. Otherwise, the method 600 may proceed to block 615. At block 613, the composer may determine whether a currently processed portlet is present in any WAR file in the WAR set. If the current portlet is present in a WAR file in the WAR set, then the method 600 may return to block 612. Otherwise, the method 600 may proceed to block 614. At block 614, the composer may alter the portlet definition by replacing the current portlet with a null portlet. The method 600 may then return to block 612. At block 615, the composer may write the resulting sets of pages, skins, themes, wires, URL mappings, and WAR files to a module definition file (for the current module page). The method 600 may then end.

Figure 7:
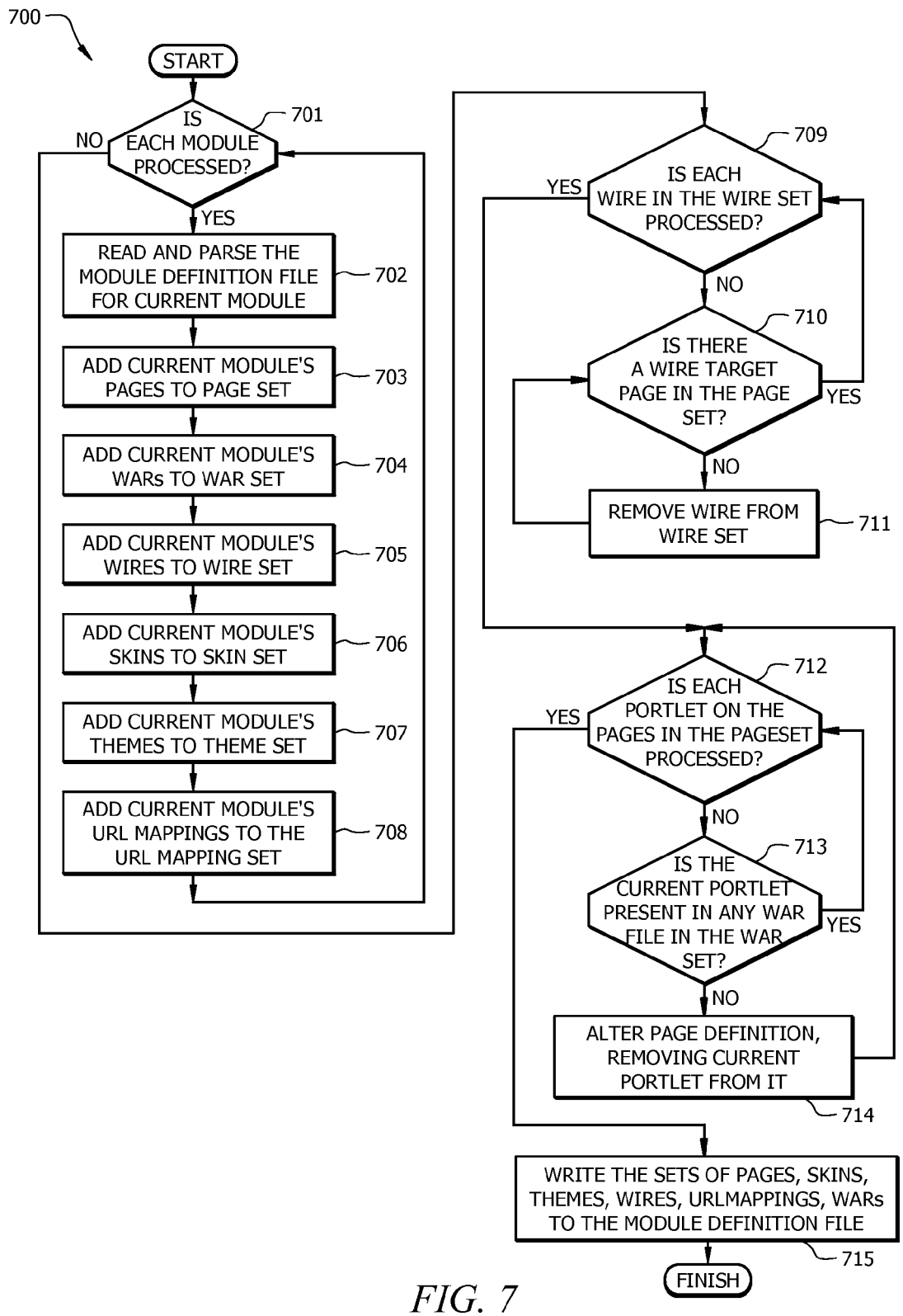
FIG. 7 is a flowchart of another embodiment of a portal composition method.

FIG. 7 illustrates an embodiment of another portal composition method 700, which may be implemented by a composer of the iCODE tool. Specifically, the portal composition method 700 may implement a silent stub module composition algorithm to fill gaps in a composed portal website or definition, which may result from missing modules. The method 700 may begin at block 701, where the composer may determine whether each module (from a set of available modules) is processed. For instance, the portal composer 250 may verify if all the available modules 240 that were obtained by decomposing the portal definition 210 (by the portal decomposer 250) are selected or included to compose another portal 210 or a variation of the portal 210. If any module is left unprocessed, then the method 700 may proceed to block 702 to process each remaining module. Otherwise, the method 700 may proceed to block 709. At block 702, the composer may read and parse a currently processed module definition file for a current module. At block 703, the composer may add the current module's pages to a page set. At block 704, the composer may add the current module's WAR files to a WAR set. At block 705, the composer may add the current module's wires to a wire set. At block 706, the composer may add the current module's skins to a skin set. At block 707, the composer may add the current module's themes to a theme set. At block 708, the composer may add the current module's URL mappings to a URL mapping set. The method 700 may then return to block 701.

At block 709, the composer may determine whether each wire in the wire set is processed. If any wire is left unprocessed, then the method 700 may proceed to block 710 to process each remaining wire. Otherwise, the method 700 may proceed to block 712. At block 710, the composer may determine whether there is a wire target page (for a currently processed wire) in the page set. If a wire target page is found in the page set, then the method 700 may return to block 709. Otherwise, the method 700 may proceed to block 711. At block 711, the composer may remove the current wire from the wire set. The method 700 may then return to block 710.

At block 712, the composer may determine whether each portlet on the pages in the page set is processed. If any portlet is left unprocessed, then the method 700 may proceed to block 713 to process each remaining portlet. Otherwise, the method 700 may proceed to block 715. At block 713, the composer may determine whether a currently processed portlet is present in any WAR file in the WAR set. If the current portlet is present in a WAR file in the WAR set, then the method 700 may return to block 712. Otherwise, the method 700 may proceed to block 714. At block 714, the composer may alter the portlet definition by removing the current portlet from the portlet definition. The method 700 may then return to block 712. At block 715, the composer may write the resulting sets of pages, skins, themes, wires, URL mappings, and WAR files to a module definition file (for the current module page). The method 700 may then end.

Figure 8:
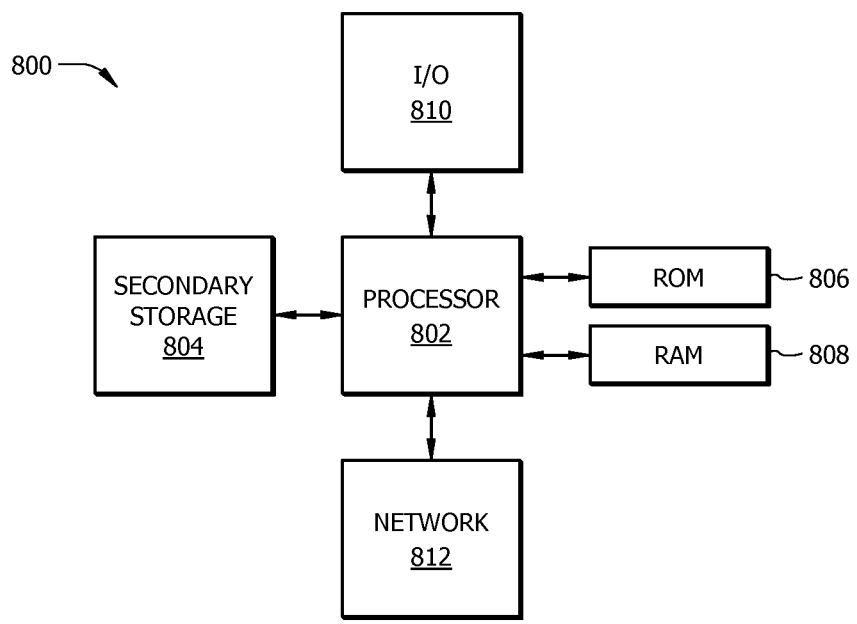
FIG. 8 is a schematic diagram of an embodiment of a general-purpose computer system.

The systems and methods described above may be implemented on any general-purpose network component, such as a computer or mobile device with sufficient processing power, memory resources, and network throughput capability to handle the necessary workload placed upon it. FIG. 8 illustrates a typical, general-purpose network component 800 suitable for implementing one or more embodiments of the systems and methods disclosed herein. The network component 800 includes a processor 802, e.g., a central processing unit (CPU), which is in communication with memory devices including secondary storage 804, read only memory (ROM) 806, random access memory (RAM) 808, input/output (I/O) devices 810, and network connectivity devices 812. The processor 802 may be implemented as one or more central processing unit (CPU) chips, or may be part of one or more application specific integrated circuits (ASICs) and/or digital signal processors (DSPs). The processor 802 may be configured to implement or support the iCODE scheme 200 and the methods 300-700.

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for developing web portals comprising:
a computer processor configured to:
generate a plurality of modules from a web portal, wherein the plurality of modules is generated based on different schemes, wherein one of the different schemes comprises generating a portion of the plurality of modules based on page hierarchy, and wherein another one of the different schemes comprises generating another portion of the plurality of modules based on a predetermined module definition; and
generate a plurality of portal versions using a plurality of selections of the modules, wherein the plurality of portal versions comprises gaps from missing modules, wherein the gaps are filled using both a null module stub approach and a silent stub approach, wherein the null module stub approach comprises adding a null portlet in a portal definition for any missing portlet associated with one of the missing modules, and adding a null portlet page comprising a null wire portlet for any missing page and portlet side of a wire associated with the one of the missing modules, and wherein the silent stub approach comprises removing any portlet associated with the one of the missing modules, and removing any page and wire associated with the one of the missing modules,
wherein the selections of the modules comprise a local module deployed on a host of the web portal and a remote module deployed on a second host coupled to the host of the web portal.

2. The apparatus of claim 1, wherein the computer processor is configured to deploy the local module at the host of the web portal and the remote module at the second host.

3. The apparatus of claim 1, wherein the computer processor is configured to generate some of the portal versions using less than all of the modules.

4. The apparatus of claim 1, wherein the web portal is an International Business Machine (IBM) Websphere portal server version 7 definition, and wherein the modules comprise a plurality of software components including themes, skins, pages, portlets, wires, and Uniform Resource Locator (URL) mappings.

5. The apparatus of claim 1, wherein the web portal comprises a plurality of portal pages that include a plurality of portlets and a plurality of Java Specification Request (JSR)-286 events.

6. The apparatus of claim 1, wherein the web portal comprises a plurality of portal pages that include a plurality of portlets and a plurality of Web Service Remote Portlets (WSRPs).

7. The apparatus of claim 1, wherein the web portal defines a web portal application for processing healthcare benefits claims, and wherein the modules comprise a contact module, claims module, a member module, and a provider module.

8. The apparatus of claim 1, wherein the web portal is exported in an Extensible Markup Language (XML) access template (XAT) file.

9. The apparatus of claim 1, wherein the portal versions are imported from corresponding Extensible Markup Language (XML) access template (XAT) files.

10. A non-transitory computer-readable medium having computer usable instructions stored thereon for execution by a processor, wherein the instructions cause the processor to:
decompose a first web portal into a plurality of portal modules, wherein the plurality of portal modules is decomposed based on different schemes, wherein one of the different schemes comprises generating a portion of the plurality of portal modules based on page hierarchy, and wherein another one of the different schemes comprises generating another portion of the plurality of portal modules based on a predetermined module definition; and
compose a second web portal that is a version of the first web portal from a set of selected modules from the portal modules, wherein the second web portal comprises gaps from missing modules, wherein the gaps are filled using both a null module stub approach and a silent stub approach, wherein the null module stub approach comprises adding a null portlet in a portal definition for any missing portlet associated with one of the missing modules, and adding a null portlet page comprising a null wire portlet for any missing page and portlet side of a wire associated with the one of the missing modules, and wherein the silent stub approach comprises removing any portlet associated with the one of the missing modules, and removing any page and wire associated with the one of the missing modules.

11. The non-transitory computer-readable medium of claim 10, wherein the instructions cause the processor to:
parse the set of selected modules to determine any gaps in the second web portal due to missing portal modules in the set of selected modules; and
fill any detected gaps in the second web portal to account for the corresponding missing portal modules.

12. The non-transitory computer-readable medium of claim 10, wherein the instructions cause the processor to deploy the set of selected modules at a local host, one or more remote hosts, or both.

13. The non-transitory computer-readable medium of claim 12, wherein the selected modules are deployed at the one or more remote hosts using one or more corresponding Web Service Remote Portlet (WSRP) specifications.

14. The non-transitory computer-readable medium of claim 12, wherein deploying the selected modules at the local host and the one or more remote hosts eliminates bad neighbor syndrome where only one or more selected modules at one host that fails are affected and the remaining selected modules deployed elsewhere remain functional.

15. A method for decomposing a web portal comprising:
decomposing a web portal that comprises a plurality of portal pages including a plurality of portlets and other software components into a plurality of modules, wherein the plurality of modules is decomposed based on different schemes, wherein one of the different schemes comprises generating a portion of the plurality of modules based on page hierarchy, and wherein another one of the different schemes comprises generating another portion of the plurality of modules based on a predetermined module definition; and
maintaining the modules in a plurality of corresponding module files to generate subsequently a plurality of web portal packages that comprise at least some of the portlets and other software components of the web portal, wherein the plurality of web portal packages comprises gaps from missing modules, wherein the gaps are filled using both a null module stub approach and a silent stub approach, wherein the null module stub approach comprises adding a null portlet in a portal definition for any missing portlet associated with one of the missing modules, and adding a null portlet page comprising a null wire portlet for any missing page and portlet side of a wire associated with the one of the missing modules, and wherein the silent stub approach comprises removing any portlet associated with the one of the missing modules, and removing any page and wire associated with the one of the missing modules.

16. The method of claim 15 further comprising deploying the module files at a plurality of servers.

17. The method of claim 15, wherein the web portal is structured into a content tree comprising a root content node and a plurality of content leafs that include themes, skins, pages, portlets, wires, and Uniform Resource Locator (URL) mappings, and wherein the modules are page hierarchy based modules that correspond to immediate children of the root content node.

18. The method of claim 15, wherein the web portal is structured into a content tree comprising a root content node and a plurality of content leafs that include themes, skins, pages, portlets, wires, and Uniform Resource Locator (URL) mappings, and wherein the modules are web archive based modules that each comprises the content leafs including one or more portlets that are defined in a corresponding Web Archive (WAR) file.

19. The method of claim 15, wherein the modules are generated based on the pre-determined module definition that selects a plurality of components of the web portal that is considered a functional unit, and wherein the modules are maintained in a plurality of corresponding Extensible Markup Language (XML) files.

20. A method for composing a web portal comprising:
composing the web portal from a subset of modules selected from a plurality of available modules that comprise a plurality of portal pages including a plurality of portlets and other software components, wherein the plurality of available modules is generated based on different schemes, wherein one of the different schemes comprises generating a portion of the plurality of available modules based on page hierarchy, and wherein another one of the different schemes comprises generating another portion of the plurality of available modules based on a predetermined module definition; and
filling any gaps in the web portal that occur due to excluding one or more of the available modules from the selected subset of modules, wherein the web portal comprises gaps from the excluded one or more of the available modules, wherein the gaps are filled using both a null module stub approach and a silent stub approach, wherein the null module stub approach comprises adding a null portlet in a portal definition for any missing portlet associated with the excluded one or more of the available modules, and adding a null portlet page comprising a null wire portlet for any missing page and portlet side of a wire associated with the excluded one or more of the available modules, and wherein the silent stub approach comprises removing any portlet associated with the excluded one or more of the available modules, and removing any page and wire associated with the excluded one or more of the available modules.

21. The method of claim 20 further comprising deploying the subset of modules at a plurality of servers.

22. The method of claim 20, wherein the gaps are filled using the null module stub approach comprises implementing a portal definition verification pass to identify any missing available modules associated with missing portlets and wires from the portal definition for the web portal.

23. The method of claim 22, wherein hg added null portlet presents details for upselling the missing module.

24. The method of claim 20, wherein the gaps are filled using the silent stub approach comprises implementing a portal definition verification pass to identify any missing available modules associated with portlets and wires from the portal definition for the web portal.

\* \* \* \* \*